US012640094B2

(12) United States Patent
Wang et al.

(10) Patent No.: US 12,640,094 B2
(45) Date of Patent: May 26, 2026

(54) PIXEL DRIVING CIRCUIT AND CONTROL METHOD THEREFOR AND DISPLAY DEVICE

(71) Applicant: BOE Technology Group Co., Ltd., Beijing (CN)

(72) Inventors: Li Wang, Beijing (CN); Baoyun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/861,268

(22) PCT Filed: Jan. 2, 2024

(86) PCT No.: PCT/CN2024/070021

§ 371 (c)(1),
(2) Date: Oct. 29, 2024

(87) PCT Pub. No.: WO2024/156246

PCT Pub. Date: Aug. 2, 2024

(65) Prior Publication Data

US 2025/0285591 A1 Sep. 11, 2025

(30) Foreign Application Priority Data

Jan. 29, 2023 (CN) ......................... 202310102939.8

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 3/30–3291; G09G 2300/0819; G09G 3/3233; G09G 2310/08;
(Continued)

(56) References Cited

U.S. PATENT DOCUMENTS

2024/0071289 A1* 2/2024 Li ............................ G09G 3/32

FOREIGN PATENT DOCUMENTS

CN 112331134 A 2/2021
CN 113838420 A 12/2021
(Continued)

OTHER PUBLICATIONS

CN-115394252-A (Year: 2022).*
(Continued)

*Primary Examiner* — Sanjiv D. Patel
(74) *Attorney, Agent, or Firm* — WHDA, LLP

(57) ABSTRACT

A pixel driving circuit and a control method therefor, and a display device are provided by the present application, wherein the pixel driving circuit is configured for driving a light-emitting element to emit light during a plurality of frame periods at a first refresh frequency, wherein each of the plurality of frame periods includes a refreshing frame and at least one holding frame in a timing sequence, and the pixel driving circuit includes: a bias sub-circuit electrically connecting a reset signal line, a first gate signal line, a first initial signal line, a data signal line and a first node, wherein the bias sub-circuit is configured to make the first node have a first bias electrical signal in a state of the holding frame.

18 Claims, 7 Drawing Sheets

(52) U.S. Cl.
CPC ... *G09G 2310/061* (2013.01); *G09G 2310/08* (2013.01); *G09G 2320/0233* (2013.01); *G09G 2320/0247* (2013.01)

(58) Field of Classification Search
CPC ... G09G 2320/0233; G09G 2300/0861; G09G 2320/0247; G09G 3/3208; G09G 2340/0435; G09G 3/32; G09G 2310/0251; H10K 59/00–95
See application file for complete search history.

(56) References Cited

FOREIGN PATENT DOCUMENTS

| | | | | | |
|---|---|---|---|---|---|
| CN | 216014774 | U | | 3/2022 | |
| CN | 115394252 | A | * | 11/2022 | ........... G09G 3/3225 |
| CN | 115662328 | A | | 1/2023 | |
| CN | 116110338 | A | | 5/2023 | |

OTHER PUBLICATIONS

Office Action dated Mar. 4, 2025, issued in counterpart CN Application No. 202310102939.8, with English translation. (11 pages).

* cited by examiner

PIXEL DRIVING CIRCUIT AND CONTROL METHOD THEREFOR AND DISPLAY DEVICE

CROSS-REFERENCES TO RELATED APPLICATIONS

The present application claims the priority of the Chinese patent application filed on Jan. 29, 2023 before the China National Intellectual Property Administration with the application number of 202310102939.8 and the title of "PIXEL DRIVING CIRCUIT AND CONTROL METHOD THEREFOR AND DISPLAY DEVICE", which is incorporated herein in its entirety by reference.

TECHNICAL FIELD

The present application relates to the technical field of displaying and, more particularly, to a pixel driving circuit and a control method therefor, and a display device.

BACKGROUND

With continuous development of technology, users hope that display devices can support both a high refresh frequency to avoid flickering and a low refresh frequency to reduce power consumption. However, the current display device is prone to flicker under the low refresh frequency, resulting in that user requirements cannot be met and user experience is poor.

SUMMARY

In order to achieve the above objects, the following technical solution is adopted by the embodiments of the present application.

In a first aspect, a pixel driving circuit and a control method therefor, and a display device are provided. The pixel driving circuit is configured for driving a light-emitting element to emit light during a plurality of frame periods at a first refresh frequency, wherein each of the plurality of the frame periods includes a refreshing frame and at least one holding frame in a timing sequence, and the pixel driving circuit includes:

a bias sub-circuit electrically connecting a reset signal line, a first gate signal line, a first initial signal line, a data signal line and a first node, wherein the bias sub-circuit is configured to make the first node have a first bias electrical signal in a state of the holding frame;

a driving sub-circuit electrically connecting the first node, a second node and a third node, wherein the driving sub-circuit is configured to conduct a path between the first node and the third node under control of a voltage of the second node, so that a current for making the light-emitting element emit the light is generated in the path, and the driving sub-circuit have a first bias process in the state of the holding frame;

a compensation sub-circuit electrically connecting a fourth node, the third node and the first gate signal line, wherein the compensation sub-circuit is configured to conduct a path between the fourth node and the third node under control of a gate signal of the first gate signal line;

a first reset sub-circuit and a second reset sub-circuit, wherein the first reset sub-circuit electrically connects the reset signal line, a second initial signal line and the second node, the first reset sub-circuit is configured to reset the second node via an initial signal of the second initial signal line under control of a reset signal of the reset signal line, the second reset sub-circuit electrically connects the reset signal line, a third initial signal line and an anode of the light-emitting element, and the second reset sub-circuit is configured to reset the anode via an initial signal of the third initial signal line under the control of the reset signal of the reset signal line;

a first light-emitting control sub-circuit and a second light-emitting control sub-circuit, wherein the first light-emitting control sub-circuit electrically connects a light-emitting control signal line, a voltage signal line and the first node, the second light-emitting control sub-circuit electrically connects the light-emitting control signal line, the third node and the anode, the first light-emitting control sub-circuit and the second light-emitting control sub-circuit are configured to transmit the current for making the light-emitting element emit the light to the anode under control of a light-emitting control signal of the light-emitting control signal line, respectively; and a storage sub-circuit electrically connecting the second node and the voltage signal line, wherein the storage sub-circuit is configured to maintain an electrical signal of the second node.

Optionally, the bias sub-circuit is further configured to, in the state of the holding frame, make the first node have the first bias electrical signal and a second bias electrical signal in the timing sequence; and the driving sub-circuit is further configured to, in the state of the holding frame, have the first bias process and a second bias process in the timing sequence.

Optionally, a range of the first refresh frequency includes 1-60 Hz.

Optionally, the pixel driving circuit further includes a regulation sub-circuit, the regulation sub-circuit electrically connects a second gate signal line, the second node and the fourth node, and the regulation sub-circuit is configured to conduct a path between the second node and the fourth node under control of a gate signal of the second gate signal line;

the driving sub-circuit includes a driving transistor;

wherein a control electrode of the driving transistor is electrically connected to the second node, a first electrode of the driving transistor is electrically connected to the first node, and a second electrode of the driving transistor is electrically connected to the third node.

Optionally, the bias sub-circuit includes a fourth transistor and a ninth transistor;

a control electrode of the fourth transistor is electrically connected to the first gate signal line, a first electrode of the fourth transistor is electrically connected to the data signal line, a second electrode of the fourth transistor is electrically connected to the first node; and a control electrode of the ninth transistor is electrically connected to the reset signal line, a first electrode of the ninth transistor is electrically connected to the first initial signal line, and a second electrode of the ninth transistor is electrically connected to the first node.

Optionally, the compensation sub-circuit includes a second transistor;

a control electrode of the second transistor is electrically connected to the first gate signal line, a first electrode of the second transistor is electrically connected to the third node, and a second electrode of the second transistor is electrically connected to the fourth node;

the first reset sub-circuit includes a first transistor, a control electrode of the first transistor is electrically connected to the reset signal line, a first electrode of the first transistor is electrically connected to the second initial signal line, and a second electrode of the first transistor is electrically connected to the fourth node;

the second reset sub-circuit includes a seventh transistor, a control electrode of the seventh transistor is electrically connected to the reset signal line, a first electrode of the seventh transistor is electrically connected to the third initial signal line, a second electrode of the seventh transistor is electrically connected to a fifth node;

the first light-emitting control sub-circuit includes a fifth transistor, a control electrode of the fifth transistor is electrically connected to the light-emitting control signal line, a first electrode of the fifth transistor is electrically connected to the voltage signal line, a second electrode of the fifth transistor is electrically connected to the first node; and the second light-emitting control sub-circuit includes a sixth transistor, a control electrode of the sixth transistor is electrically connected to the light-emitting control signal line, a first electrode of the sixth transistor is electrically connected to the third node, and a second electrode of the sixth transistor is electrically connected to the anode.

Optionally, the regulation sub-circuit includes an eighth transistor; and a control electrode of the eighth transistor is electrically connected to the second gate signal line, a first electrode of the eighth transistor is electrically connected to the second node, and a second electrode of the eighth transistor is electrically connected to the fourth node.

Optionally, the eighth transistor includes an oxide transistor.

In another aspect, a display device is provided, wherein the display device includes the pixel driving circuit stated above.

In yet another aspect, a control method for controlling the pixel driving circuit stated above is provided, wherein the control method includes:

inputting the first bias electrical signal into the data signal line in the state of the holding frame.

Optionally, the control method further includes:

in the state of the holding frame, inputting the first bias electrical signal into the data signal line in the timing sequence, and inputting a second bias electrical signal into the first initial signal line in the timing sequence.

In yet another aspect, a control method for controlling the pixel driving circuit stated above is provided, wherein the control method includes:

inputting the first bias electrical signal into the first initial signal line in the state of the holding frame.

Optionally, in the control method further includes:

in the state of the holding frame, inputting the first bias electrical signal into the first initial signal line in the timing sequence, and inputting a second bias electrical signal into the data signal line in the timing sequence.

The above description is only an overview of the technical solution of the present application, in order to be able to better understand the technical means of the present application, and the solution can be implemented in accordance with the content of the description, and in order to make the above and other purposes, features and advantages of the present application more obvious and easy to understand, the following specific embodiments of the present application are hereby given.

BRIEF DESCRIPTION OF THE DRAWINGS

In order to illustrate embodiments of the present application or the technical scheme in the related art more clearly, the drawings required in the description of the embodiments or the related art will be briefly introduced below; obviously, the drawings in the following description are only some embodiments of the present application, and other drawings can be obtained according to these drawings by a person skilled in the art without paying creative labor.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, terms such as "first", "second", "fourth" "fifth", "sixth", "seventh", "eighth", etc., are used to distinguish the same items or similar items that have essentially the same functions and roles, these terms are solely for clearly describing the technical solutions of the embodiments of the present application and should not be understood as indicating or implying any relative importance or implicitly specifying the quantity of the indicated technical features.

In the embodiments of the present application, the gate electrode of the transistor is referred to as the "control electrode", one of the source electrode and the drain electrode is referred to as the "first electrode", and the other is referred to as the "second electrode". In the embodiments of the present application, the first electrodes of all transistors are called the drain electrodes, and the second electrodes of all transistors are called the source electrodes.

In the embodiments of the present application, the term of "electrically connecting" may mean either direct electrical connection between two components or electrical connection between two components via one or more other components.

Figure 1:
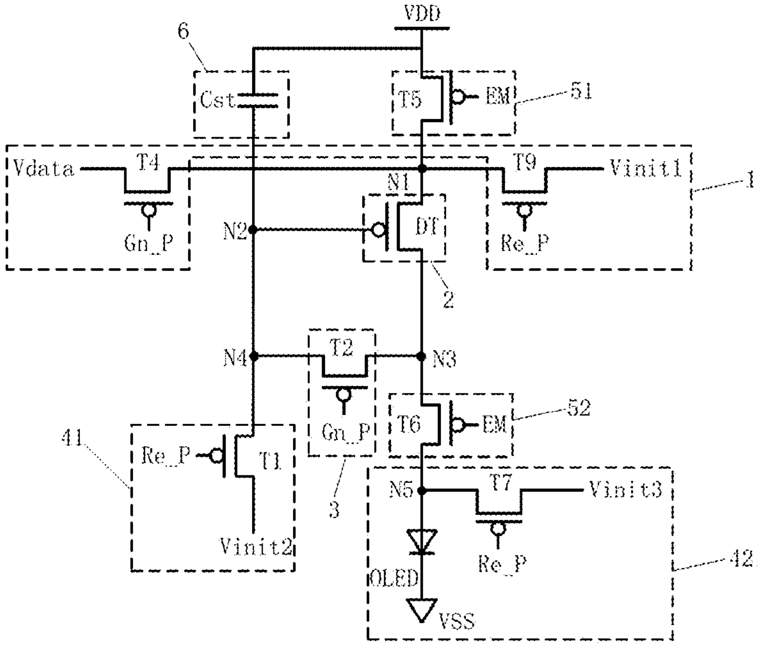
FIG. 1 is a schematic diagram of a pixel driving circuit according to an embodiment of the present application.
Figure 2:
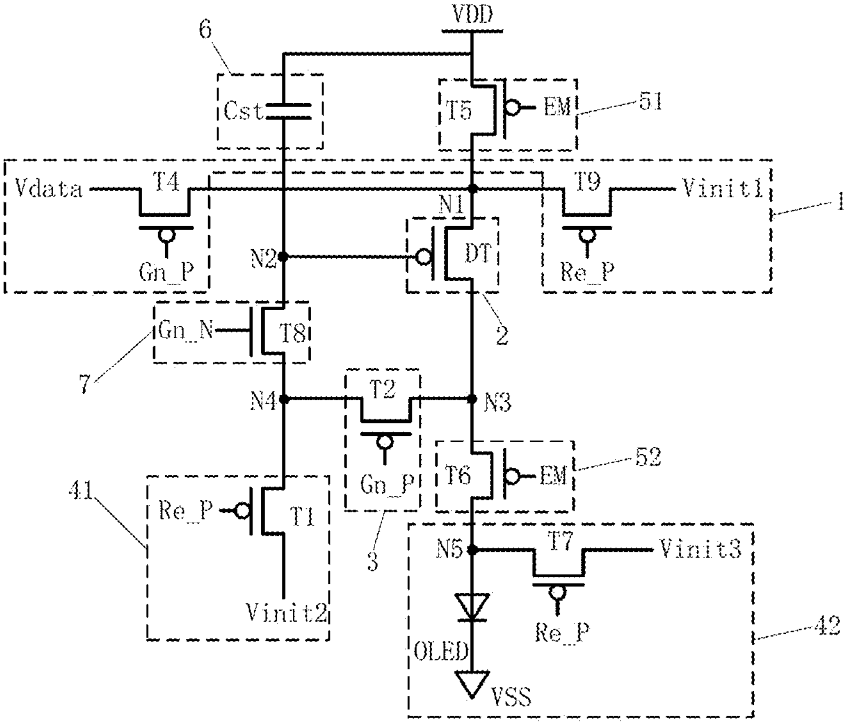
FIG. 2 is a schematic diagram of another pixel driving circuit according to an embodiment of the present application.

A pixel driving circuit and a control method therefor, and a display device are provided by the embodiments of the present application. The pixel driving circuit is configured for driving a light-emitting element to emit light during a plurality of frame periods at a first refresh frequency, wherein each of the plurality of frame periods includes a refreshing frame and at least one holding frame in a timing sequence. Referring to FIG. 1 and FIG. 2, the pixel driving circuit includes:

a bias sub-circuit 1 electrically connecting a reset signal line Re_P, a first gate signal line Gn_P, a first initial signal line Vinit1, a data signal line Vdata and a first node N1, wherein the bias sub-circuit 1 is configured to make the first node N1 have a first bias electrical signal in a state of the holding frame;

a driving sub-circuit 2 electrically connecting the first node N1, a second node N2 and a third node N3, wherein the driving sub-circuit 2 is configured to conduct a path between the first node N1 and the third node N3 under control of a voltage of the second node N2, so that a current for making the light-emitting element emit the light is generated in the path, and the driving sub-circuit have a first bias process in the state of the holding frame;

a compensation sub-circuit 3 electrically connecting a fourth node N4, the third node N3 and the first gate signal line Gn_P, wherein the compensation sub-circuit 3 is configured to conduct a path between the fourth node N4 and the third node N3 under control of a gate signal of the first gate signal line Gn_P;

a first reset sub-circuit 41 and a second reset sub-circuit 42, wherein the first reset sub-circuit 41 electrically connects the reset signal line Re_P, a second initial signal line Vinit2 and the second node N2, the first reset sub-circuit 41 is configured to reset the second node N2 via an initial signal of the second initial signal line Vinit2 under control of a reset signal of the reset signal line Re_P, the second reset sub-circuit 42 electrically connects the reset signal line Re_P, a third initial signal line Vinit3 and an anode of the light-emitting element, and the second reset sub-circuit 42 is configured to reset the anode via an initial signal of the third initial signal line Vinit3 under the control of the reset signal of the reset signal line Re_P;

a first light-emitting control sub-circuit 51 and a second light-emitting control sub-circuit 52, wherein the first light-emitting control sub-circuit 51 electrically connects a light-emitting control signal line EM, a voltage signal line VDD and the first node N1, the second light-emitting control sub-circuit 52 electrically connects the light-emitting control signal line EM, the third node N3 and the anode, the first light-emitting control sub-circuit 51 and the second light-emitting control sub-circuit 52 are configured to transmit the current for making the light-emitting element emit the light to the anode under control of a light-emitting control signal of the light-emitting control signal line EM, respectively; and a storage sub-circuit 6 electrically connecting the second node N2 and the voltage signal line VDD, wherein the storage sub-circuit 6 is configured to maintain an electrical signal of the second node N2.

As shown in FIG. 1, the anode of the light-emitting element can be electrically connected to the fifth node N5, and the cathode of the light-emitting element can be electrically connected to the grounding end VSS.

The above first refresh frequency refers to the low refresh frequency. Here, the range and driving mode of the first refresh frequency are not specifically limited. Exemplarily, a range of the first refresh frequency can include 1-60 Hz. Exemplarily, the first refresh frequency can be driven in a LongV mode. Taking that the LongV mode with the high refresh frequency 120 Hz and the low refresh frequency 10 Hz is driven by sharing gamma voltage (Gamma) as an example, at this moment, the charging time of the pixel driving circuit at the low refresh frequency is the same as the charging time of the pixel driving circuit at the high refresh frequency. Specifically, at the high refresh frequency, time of a frame is $\frac{1}{120}$ s, the frames are all refreshing frames. At the low refresh frequency, the time of a frame is $\frac{1}{10}$ s, the time of the refreshing frame in this frame is still $\frac{1}{120}$ s, and the rest of the time is holding frame $\frac{11}{120}$ s, at this moment, the frames includes one refreshing frame and eleven holding frames. The pixel driving circuit refreshes the display screen in the refreshing frame, and does not refresh the display screen in the holding frame, but make the display screen keep or be inserted black.

The specific circuit structures of the bias sub-circuit, the driving sub-circuit, the compensation sub-circuit, the first reset sub-circuit, the second reset sub-circuit, the first light-emitting control sub-circuit, the second light-emitting control sub-circuit and the storage sub-circuit are not limited, as long as the corresponding functions are satisfied.

The first node, the second node, the third node, the fourth node and the fifth node are only defined for facilitating the description of the circuit structure. The first node, the second node, the third node, the fourth node and the fifth node are not an actual circuit unit.

In the pixel driving circuit provided by the embodiments of the present application, the bias sub-circuit is configured to make the first node N1 have the first bias electrical signal in the state of the holding frame, and the driving sub-circuit has the first bias process in the state of the holding frame. Therefore, by increasing the bias in the holding frame to reduce or eliminate the effect of the bias of the refreshing frame on the driving sub-circuit, the uneven brightness caused by the difference between the refreshing frame and the holding frame of the pixel driving sub-circuit can be effectively reduced or eliminated, and the flicker problem of the display device applying this pixel driving circuit can be effectively improved. That is, through the cooperation of the bias sub-circuit, the driving sub-circuit, the compensation sub-circuit, the first reset sub-circuit and the second reset sub-circuit, the first light-emitting control sub-circuit, the second light-emitting control sub-circuit, and the storage sub-circuit with each other, the light-emitting element is allowed to emit light at the first refresh frequency and flicker is reduced or eliminated.

Optionally, referring to FIGS. 1 and 2, the bias sub-circuit 1 is further configured to, in the state of the holding frame, make the first node N1 have the first bias electrical signal and a second bias electrical signal in the timing sequence; and the driving sub-circuit 2 is further configured to, in the state of the holding frame, have the first bias process and a second bias process in the timing sequence.

Optionally, a range of the first refresh frequency includes 1-60 Hz.

Here, the first refresh frequency stated above is not specifically limited. Exemplarily, the first refresh frequency can be 1 Hz, 10 Hz, 20 Hz, 30 Hz, 40 Hz, 50 Hz or 60 Hz and so on.

Optionally, referring to FIG. 2, the pixel driving circuit also includes a regulation sub-circuit 7, the regulation sub-circuit 7 electrically connects a second gate signal line Gn_N, the second node N2 and the fourth node N4, and the regulation sub-circuit 7 is configured to conduct a path between the second node N2 and the fourth node N4 under control of a gate signal of the second gate signal line Gn_N.

Referring to FIGS. 1 and 2, the driving sub-circuit 2 includes a driving transistor DT. A control electrode of the driving transistor DT is electrically connected to the second node N2, a first electrode of the driving transistor is electrically connected to the first node N1, and a second electrode of the driving transistor is electrically connected to the third node N3.

Optionally, referring to FIGS. 1 and 2, the bias sub-circuit 1 includes a fourth transistor T4 and a ninth transistor T9. A control electrode of the fourth transistor T4 is electrically connected to the first gate signal line Gn_P, a first electrode of the fourth transistor is electrically connected to the data signal line Vdata, a second electrode of the fourth transistor is electrically connected to the first node N1; and a control electrode of the ninth transistor T9 is electrically connected to the reset signal line Re_P, a first electrode of the ninth transistor is electrically connected to the first initial signal line Vinit1, and a second electrode of the ninth transistor is electrically connected to the first node N1.

Optionally, referring to FIGS. 1 and 2, the compensation sub-circuit 3 includes a second transistor T2. A control electrode of the second transistor T2 is electrically connected to the first gate signal line Gn_P, a first electrode of the second transistor is electrically connected to the third node N3, and a second electrode of the second transistor is electrically connected to the fourth node N4.

Referring to FIGS. 1 and 2, the first reset sub-circuit 41 includes a first transistor T1, a control electrode of the first transistor T1 is electrically connected to the reset signal line Re_P, a first electrode of the first transistor is electrically connected to the second initial signal line Vinit2, and a second electrode of the first transistor is electrically connected to the fourth node N4. The second reset sub-circuit 42 includes a seventh transistor T7, a control electrode of the seventh transistor T7 is electrically connected to the reset signal line Re_P, a first electrode of the seventh transistor is electrically connected to the third initial signal line Vinit3, a second electrode of the seventh transistor is electrically connected to a fifth node N5.

Referring to FIGS. 1 and 2, the first light-emitting control sub-circuit 51 includes a fifth transistor T5, a control electrode of the fifth transistor T5 is electrically connected to the light-emitting control signal line EM, a first electrode of the fifth transistor is electrically connected to the voltage signal line VDD, a second electrode of the fifth transistor is electrically connected to the first node N1. The second light-emitting control sub-circuit 52 includes a sixth transistor T6, a control electrode of the sixth transistor T6 is electrically connected to the light-emitting control signal line EM, a first electrode of the sixth transistor is electrically connected to the third node N3, and a second electrode of the sixth transistor is electrically connected to the anode.

Optionally, referring to FIG. 1 and FIG. 2, the storage sub-circuit 6 includes a first capacitor Cst. One end of the first capacitor Cst is electrically connected to the voltage signal line VDD, and the other end of the first capacitor Cst is electrically connected to the second node N2.

Optionally, referring to FIG. 2, the regulation sub-circuit 7 includes an eighth transistor T8. A control electrode of the eighth transistor T8 is electrically connected to the second gate signal line Gn_N, a first electrode of the eighth transistor is electrically connected to the second node N2, and a second electrode of the eighth transistor is electrically connected to the fourth node N4.

Optionally, the eighth transistor includes an oxide transistor. Therefore, the low leakage characteristics of the oxide transistor can be used to effectively improve a voltage retention rate of a long frame period.

It should be noted that in FIG. 2, except the eighth transistor, the other transistors are non-oxide transistors, such as LTPS (low temperature poly-silicon) transistors. Or, at least one of the above other transistors can also be an oxide transistor, which is not specifically limited here. Of course, it can also be that all transistors in FIG. 2 are non-oxide transistors, which is based on practical applications.

In order to unify the fabrication process and make the driving method of subsequent circuits simpler, the driving transistor, the first transistor, the second transistor, the fourth transistor, the fifth transistor, the sixth transistor and the seventh transistor can all be the P-type transistors, and the eighth transistor can be the N-type transistor. Of course, all the above transistors can also be N-type transistors. In the case where the transistors stated above are N-type transistors, the design principle is similar to the design principle of the present application and also falls within the scope of protection of the present application.

The type of transistor is not limited, which can be a thin film transistor, the thin film transistor can be a low temperature poly-silicon thin film transistor or an oxide thin film transistor.

It should be noted that if the pixel driving circuit is applied to the OLED display device, the above light-emitting element is an organic light-emitting element. If the pixel driving circuit is applied to a Mini LED display device or a Micro LED display device, the light-emitting element stated above is a Mini LED or a Micro LED.

A display device is also provided by the embodiments of the present application, the display device includes the pixel driving circuit stated above.

The above display device can be either a flexible display device (also known as a flexible screen) or a rigid display device (i.e., a display screen that cannot be bent), which is not limited here.

The above display device can be an OLED (organic light-emitting diode) display device, a Micro LED display device or a Mini LED display device, and any product or component with display function, such as a TV, a digital camera, a mobile phone, a tablet computer, etc., including these display devices. The above display device can also be applied to identity recognition, medical devices and other fields. Products that have been promoted or have good promotion prospects include security identity authentication, intelligent door locks, medical image acquisition and so on.

The above display device has the advantages of effectively reducing flicker at the low refresh frequency, low cost, good display effect, long life, high stability, high contrast, good imaging quality, high product quality and so on.

A control method for controlling the pixel driving circuit is further provided by the embodiments of the present application, the control method includes:

S11, inputting the first bias electrical signal into the data signal line in the state of the holding frame.

Optionally, the control method further includes:

S12, in the state of the holding frame, inputting the first bias electrical signal into the data signal line in the timing sequence, and inputting a second bias electrical signal into the first initial signal line in the timing sequence.

A control method for controlling the pixel driving circuit is further provided by the embodiments of the present application, the control method includes:

S21, inputting the first bias electrical signal into the first initial signal line in the state of the holding frame.

Optionally, the control method further includes:

in the state of the holding frame, inputting the first bias electrical signal into the first initial signal line in the timing sequence, and inputting a second bias electrical signal into the data signal line in the timing sequence.

The above first refresh frequency can be the low refresh frequency (e.g., 10 HZ refresh frequency), when the pixel driving circuit works at the low refresh frequency, the timing sequences shown in FIG. 3 and FIG. 4 can be referred to, which is described as follows.

In the following, by taking that the eighth transistor is an N-type oxide transistor, the first transistor, the second transistor, the fourth transistor, the fifth transistor, the sixth transistor and the seventh transistor are all P-type low-temperature poly-silicon transistor as an example, in combination with the timing diagrams of signal lines shown in FIG. 3, the working principle of the pixel driving circuit shown in FIG. 2 at the low refresh frequency (e.g. 10 HZ refresh frequency) provided by the embodiments of the present application is described in detail. It should be noted that in FIGS. 5 to 11, the transistor that is turned off is marked by "x", and the light-emitting element that does not emit light is also marked by "x".

Figure 3:
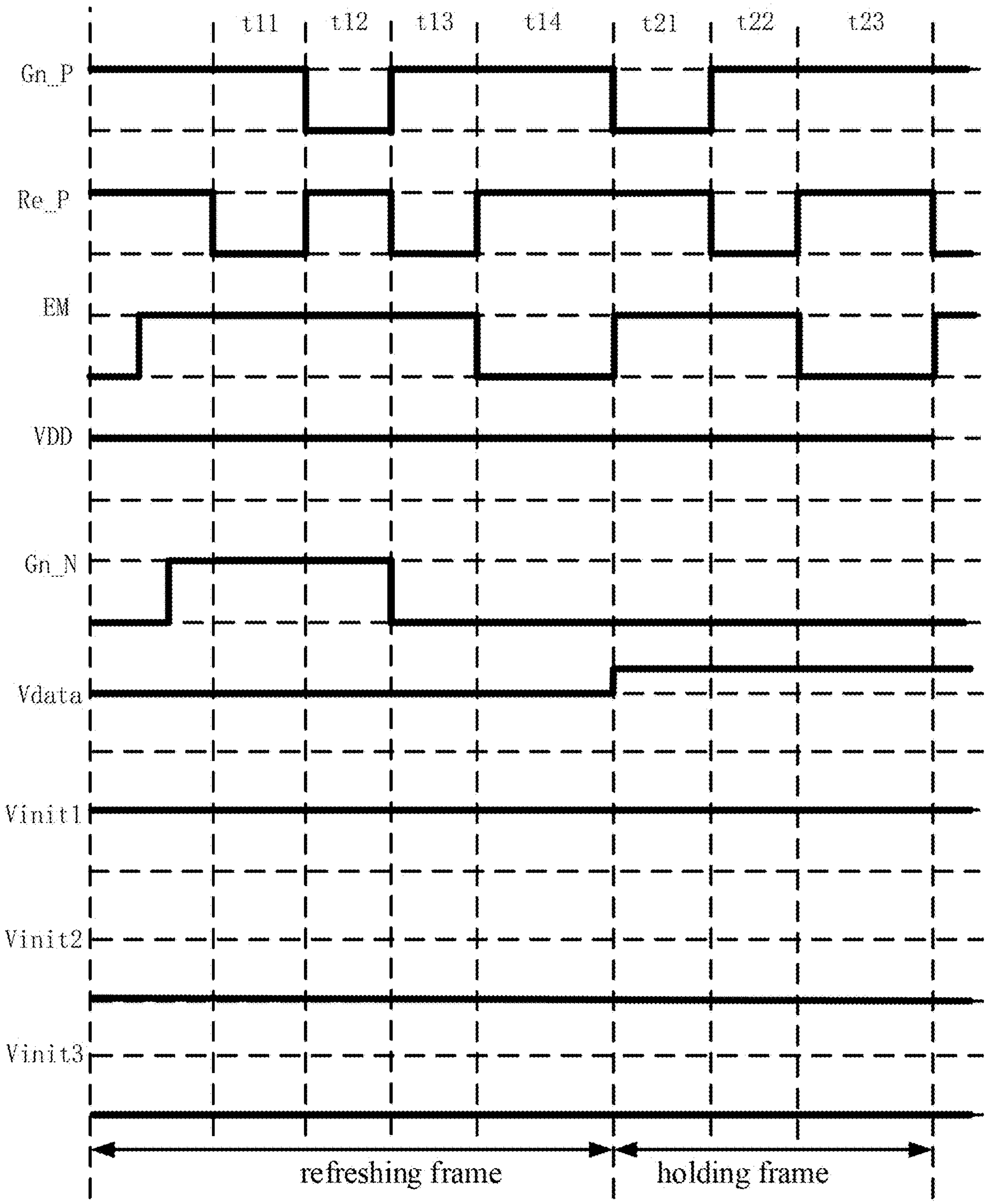
FIG. 3 is a driving timing diagram of a pixel driving circuit according to an embodiment of the present application.

The Refreshing Frame:

In the reset stage of the refreshing frame, that is, the t11 stage in FIG. 3, the high-level signals are input into the voltage signal line VDD, the data signal line Vdata, the first initial signal line Vinit1, the first gate signal line Gn_P, the light-emitting control signal line EM, the second gate signal line Gn_N; and the low-level signals are input into the second initial signal line Vinit2, the third initial signal line Vinit3, the reset signal line Re_P. At this moment, referring to FIG. 5, the first transistor T1, the seventh transistor T7, the ninth transistor T9 and the eighth transistor T8 are turned on, the second transistor T2, the fourth transistor T4, the fifth transistor T5, the sixth transistor T6 and the driving transistor DT are turned off. Since the seventh transistor T7 is turned on, the initial signal of the third initial signal line Vinit3 can be written into the fifth node N5 and the anode of the light-emitting transistor, the fifth node N5 and the anode of the light-emitting transistor are reset. Since the first transistor T1 and the eighth transistor T8 are both turned on, the initial signal of the second initial signal line Vinit2 can be written into the second node N2 (the initial signal of the second initial signal line Vinit2 is usually from −5v to −3v), and since the ninth transistor T9 is turned on, the initial signal of the first initial signal line Vinit1 can be written into the first node N1 (the initial signal of the first initial signal line Vinit1 is usually from 5v to 7v), and at this moment, the gate-source voltage of the driving transistor DT is Vgs=Vinit2−Vinit1. The driving transistor DT is in the on-bias, which is the reset bias process, that is, the strong negative bias process, the effect of the gray-scale voltage of the previous frame can be effectively eliminated, and the short-term residual shadow and FFR (first frame ratio) level are significantly improved.

In the writing stage of the refreshing frame, which is the t12 stage in FIG. 3, the high-level signals are input into the reset signal line Re_P, the light-emitting control signal line EM, the voltage signal line VDD, the data signal line Vdata, the second gate signal line Gn_N, the first initial signal line Vinit1, and the low-level signals are input into the first gate signal line Gn_P, the second initial signal line Vinit2, the third initial signal line Vinit3. At this moment, referring to FIG. 6, the second transistor T2, the fourth transistor T4, the eighth transistor T8 and the driving transistor DT are turned on, the first transistor T1, the seventh transistor T7, the ninth transistor T9, the fifth transistor T5 and the sixth transistor T6 are turned off. Since the second transistor T2, the fourth transistor T4, and the eighth transistor T8 are all turned on, the driving transistor DT is a diode connection mode, and the data signal data of the data signal line Vdata is written into the first node N1 and charges the first capacitor Cst. The potential of the first node N1 at the finishing state is Vdata+Vth. At this moment, the gate-source voltage of the driving transistor DT is Vgs=Vth (Vth is the threshold voltage of the driving transistor DT), and the driving transistor DT is in the off-bias.

In the light-emitting stage of the refreshing frame, that is, the t14 stage in FIG. 3, the high-level signals are input into the voltage signal line VDD, the data signal line Vdata, the first initial signal line Vinit1, the first gate signal line Gn_P, and the reset signal line Re_P, and the low-level signals are input into the light-emitting control signal line EM, the second gate signal line Gn_N, the second initial signal line Vinit2 and the third initial signal line Vinit3. At this moment, referring to FIG. 8, the fifth transistor T5, the sixth transistor T6 and the driving transistor DT are turned on, and the first transistor T1, the seventh transistor T7, the ninth transistor T9, the eighth transistor T8, the second transistor T2 and the fourth transistor T4 are turned off. Since the fifth transistor T5, the sixth transistor T6 and the driving transistor DT are all turned on, at this moment, the current input by the voltage signal line VDD flows into the anode of the light-emitting element, thereby the light-emitting element is driven to emit light.

The Holding Frame:

In the first bias stage of the holding frame, that is, the t21 stage in FIG. 3, the high-level signals are input into the voltage signal line VDD, the data signal line Vdata, the first initial signal line Vinit1, the reset signal line Re_P, the light-emitting control signal line EM; and the low-level signals are input into the first gate signal line Gn_P, the second gate signal line Gn_N, the second initial signal line Vinit2 and the third initial signal line Vinit3. At this moment, referring to FIG. 9, the fourth transistor T4, the second transistor T2 and the driving transistor DT are turned on, and the fifth transistor T5, the sixth transistor T6, the first transistor T1, the seventh transistor T7, the ninth transistor T9 and eighth transistor T8 are turned off. Since the fourth transistor T4 is turned on, the Vkeep voltage of the data signal line Vdata (referring to FIG. 3, the voltage value of the Vkeep voltage is greater than the voltage value of the data voltage Vdata) is written into the first node N1, at this moment, the first node N1 has the first bias electrical signal, and the gate-source voltage of the driving transistor DT is Vgs=Vdata+Vth−Vkeep, which is the first bias process.

In the light-emitting stage of the holding frame, that is, the t23 stage in FIG. 3, the high-level signals are input into the voltage signal line VDD, the data signal line Vdata, the first initial signal line Vinit1, the first gate signal line Gn_P and the reset signal line Re_P; and the low-level signals are input into the light-emitting control signal line EM, the second gate signal line Gn_N, the second initial signal line Vinit2 and the third initial signal line Vinit3. At this moment, referring to FIG. 11, the fifth transistor T5, the sixth transistor T6 and the driving transistor DT are all turned on. The first transistor T1, the seventh transistor T7, the ninth transistor T9, the eighth transistor T8, the second transistor T2 and the fourth transistor T4 are all turned off. Since the fifth transistor T5, the sixth transistor T6 and the driving transistor DT are all turned on, at this moment, the current input by the voltage signal line VDD flows into the anode of the light-emitting element, thereby the light-emitting element is driven to emit light.

It should be noted that the initial signal and Vkeep voltage of the first initial signal line Vinit1 can be as high as possible within an appropriate range, thus the compatibility between different gray scales can be effectively improved.

In FIG. 3, the reset signal of the reset signal line Re_P and the gate signal of the first gate signal line Gn_P can be high-frequency pulses.

In FIG. 3, the initial signal of the first initial signal line Vinit1 can be a DC (direct current) signal, that is, the initial signal of the first initial signal line Vinit1 can remain unchanged. At this moment, in the first bias stage of the holding frame, it is set that the voltage value input by the data signal line Vdata is greater than the Vkeep voltage of the data voltage Vdata.

In order to make the driving timing simple, the driving timing signals of the voltage signal line VDD, the second initial signal line Vinit2 and the third initial signal line Vinit3 provided in the embodiments of the present application are only one case. In the practical applications, it can also be driving signals of other timing sequences. For example, in the t14 and t23 stages shown in FIG. 3, since the first transistor T1, the second transistor T2 and the seventh transistor T7 in FIG. 2 are all turned off, the signals of the second initial signal line Vinit2 and the third initial signal line Vinit3 can be of a high level or a low level.

A control method is provided by the embodiments of the present application. In the control method, through the reset stage of the refreshing frame, the writing stage of the refreshing frame, the light-emitting stage of the refreshing frame, the first bias stage of the holding frame, the light-emitting stage of the holding frame, it is made that the refreshing frame and the holding frame both contain a bias process. On the one hand, the first bias stage of the holding frame can be equivalent to the reset bias process of the reset stage of the refreshing frame, so that the working state of the driving transistor DT tends to be consistent, so as to ensure that the brightness of the refreshing frame is not significantly different from the brightness of the holding frame, and there is no visual flicker sensation. Specifically, the effect of the first bias stage of the holding frame on the driving transistor DT and the effect of the reset bias process of the reset stage of the refreshing frame on the driving transistor DT can be equivalent through the Vkeep voltage, thereby the effect of the reset bias of the reset stage is partially or completely offset. On the other hand, it can be realized that the above pixel driving circuit drives the light-emitting element to emit light. On the other hand, the timing sequence is simple and easy to implement.

Optionally, the Refreshing Frame:

In the third bias stage of the refreshing frame, that is, the t13 stage in FIG. 3, the high-level signals are input into the voltage signal line VDD, the data signal line Vdata, the first initial signal line Vinit1, the first gate signal line Gn_P and the light-emitting control signal line EM; and the low-level signals are input into the second gate signal line Gn_N, the second initial signal line Vinit2, the third initial signal line Vinit3 and the reset signal line Re_P. At this moment, referring to FIG. 7, the first transistor T1, the seventh transistor T7, the ninth transistor T9 and the driving transistor DT are turned on, and the second transistor T2, the fourth transistor T4, the fifth transistor T5, the sixth transistor T6 and the eighth transistor T8 are turned off. Since the ninth transistor T9 is turned on, the initial signal of the first initial signal line Vinit1 is written into the first node N1, and the first capacitor Cst keeps the potential of the second node N2 constant, at this moment, the gate-source voltage of the driving transistor DT is Vgs=Vdata+Vth−Vinit1, which is the third bias process, that is, the negative pressure bias process.

The Holding Frame:

In the second bias stage of the holding frame, that is, the t22 stage in FIG. 3, the high-level signals are input into the voltage signal line VDD, the data signal line Vdata, the first initial signal line Vinit1, the first gate signal line Gn_P and the light-emitting control signal line EM; and the low-level signals are input into the second gate signal line Gn_N, the second initial signal line Vinit2, the third initial signal line Vinit3 and the reset signal line Re_P. At this moment, referring to FIG. 10, the first transistor T1, the seventh transistor T7, the ninth transistor T9 and the driving transistor DT are all turned on. The second transistor T2, the fourth transistor T4, the fifth transistor T5, the sixth transistor T6 and the eighth transistor T8 are all turned off. Since the ninth transistor T9 is turned on, the second bias electrical signal of the first initial signal line Vinit1 is written into the first node N1, at this moment, the gate-source voltage of the driving transistor DT is Vgs=Vdata+Vth−Vinit1, which is the second bias process.

It should be noted that the bias voltage and bias time of the second bias stage of the holding frame can be exactly the same as the bias voltage and bias time of the third bias stage of the refreshing frame to ensure that the effect of the second bias process of the holding frame is equivalent to the effect of the third bias process of the refreshing frame, so that the voltages at the three ends of the driving transistor DT are unified before the OLED emits light to ensure that the initial light-emitting states of the refreshing frame and the holding frame are consistent.

A control method is provided by the embodiments of the present application. In the control method, through the reset stage of the refreshing frame, the writing stage of the refreshing frame, the second bias stage of the refreshing frame, the light-emitting stage of the refreshing frame, the first bias stage of the holding frame, the third bias stage of the holding frame and the light-emitting stage of the holding frame, it is made that the refreshing frame and the holding frame both contain two biasing processes. On the one hand, the first bias stage of the holding frame is equivalent to the reset bias process of the reset stage of the refreshing frame, and the second bias process of the holding frame is equivalent to the third bias process of the refreshing frame, so that the working state of the driving transistor DT tends to be consistent, so as to ensure that the brightness of the refreshing frame is not significantly different from the brightness of the holding frame, and there is no visual flicker sensation. Specifically, through the Vkeep voltage, the effect of the first bias stage of the holding frame on the driving transistor DT and the effect of the reset bias process of the reset stage of the refreshing frame on the driving transistor DT can be equivalent, and through the second bias electrical signal of the first initial signal line Vinit1, the effect of the second bias stage of the holding frame on the driving transistor DT is equivalent to the effect of the third bias process of the refreshing frame on the driving transistor DT, thereby the effects of the reset bias process and the third bias process of the refreshing frame are partially or completely offset. On the other hand, it can be realized that the above pixel driving circuit drives the light-emitting element to emit light. On the other hand, the timing sequence is simple and easy to implement.

In the following, taking that the eighth transistor is an N-type oxide transistor, the first transistor, the second transistor, the third transistor, the fourth transistor, the fifth transistor, the sixth transistor and the seventh transistor are all P-type low-temperature poly-silicon transistors, in combination with the timing diagrams of signal lines shown in FIG. 4, the working principle of the pixel driving circuit shown in FIG. 2 at the low refresh frequency (e.g. 10 HZ refresh frequency) provided by embodiments of the present application is described in detail.

Figure 4:
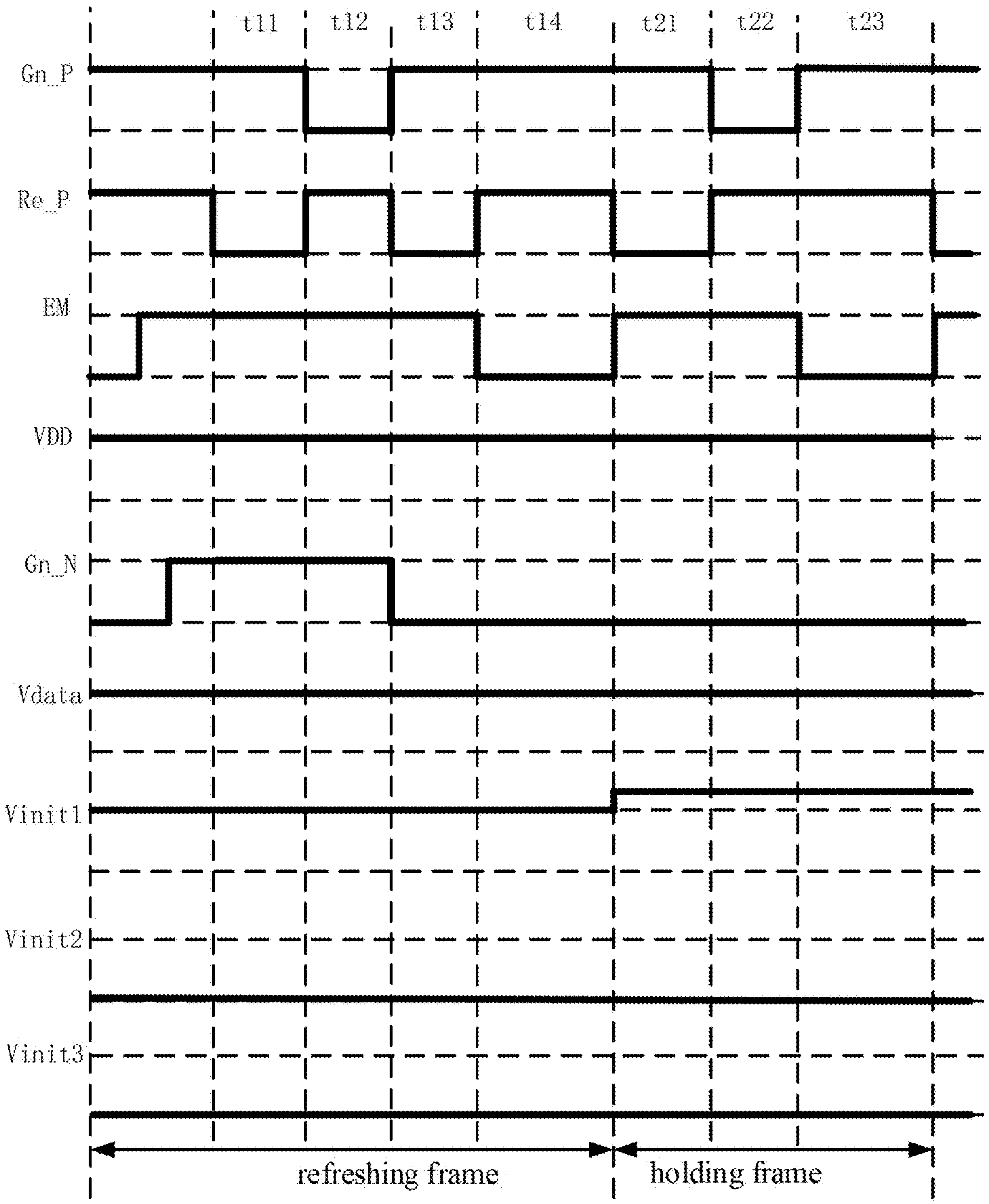
FIG. 4 is a driving timing diagram of another pixel driving circuit according to an embodiment of the present application.
Figure 5:
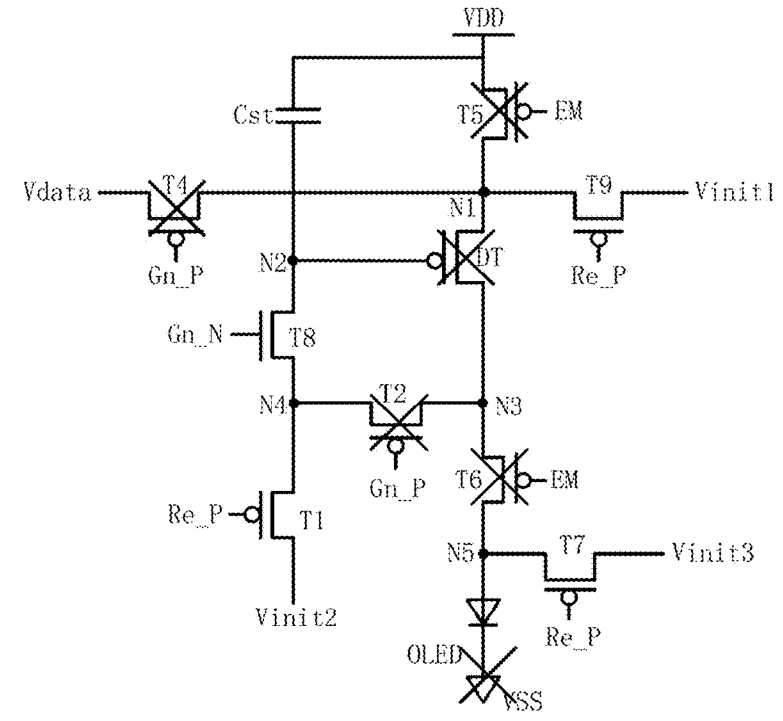
FIGS. 5 to 11 are schematic diagrams of the driving principles of the pixel driving circuit in FIG. 2 under the driving timing shown in FIGS. 3 and 4.
Figure 6:
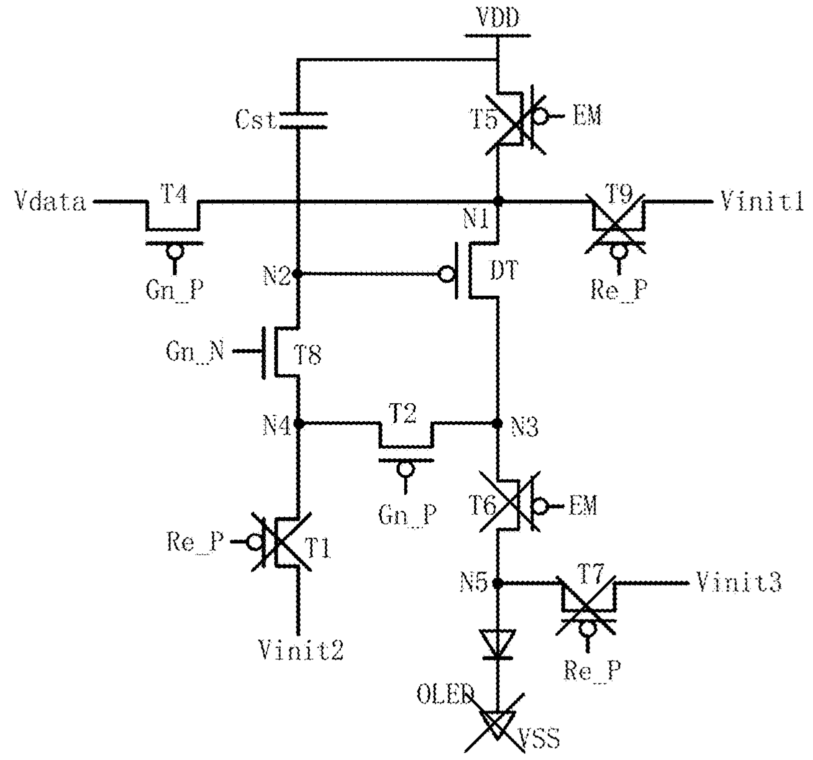
Figure 7:
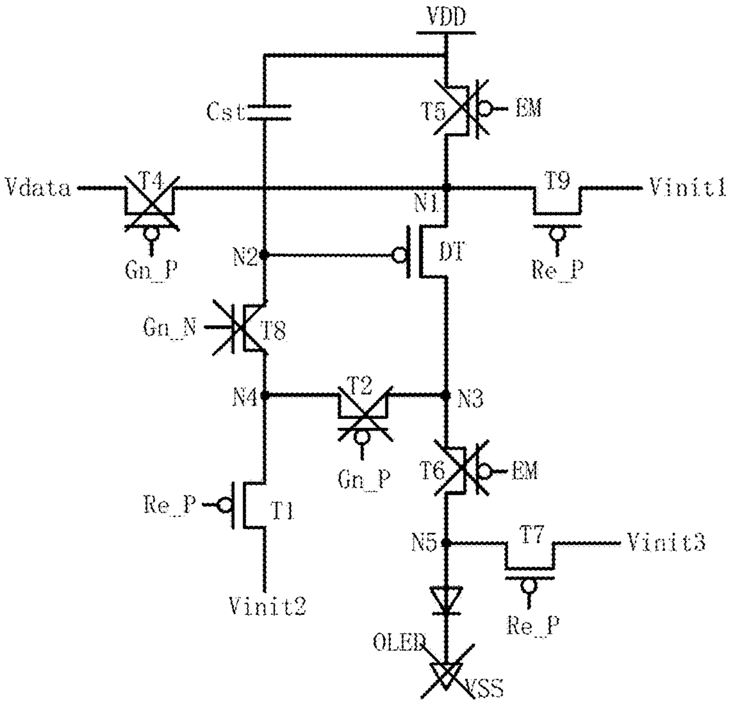
Figure 8:
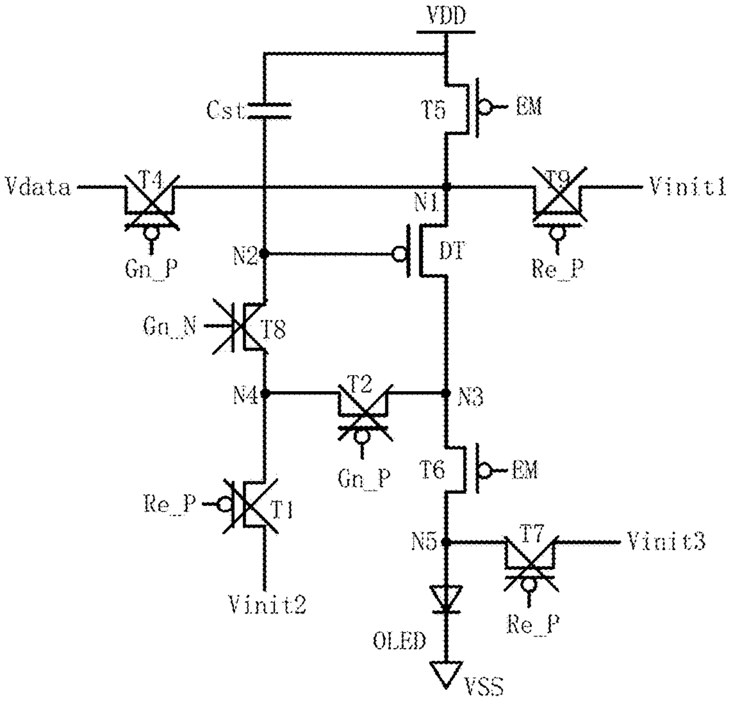
Figure 9:
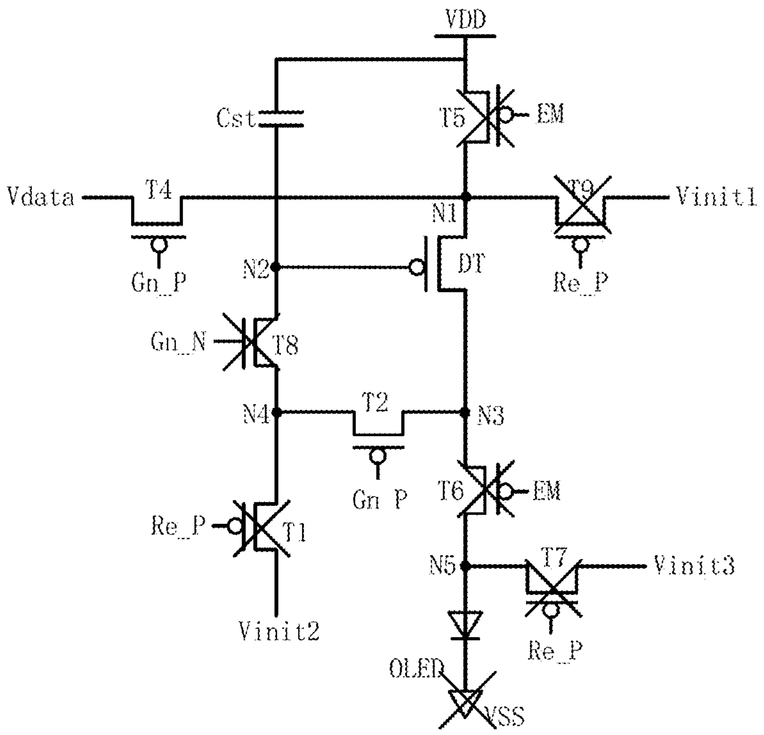
Figure 10:
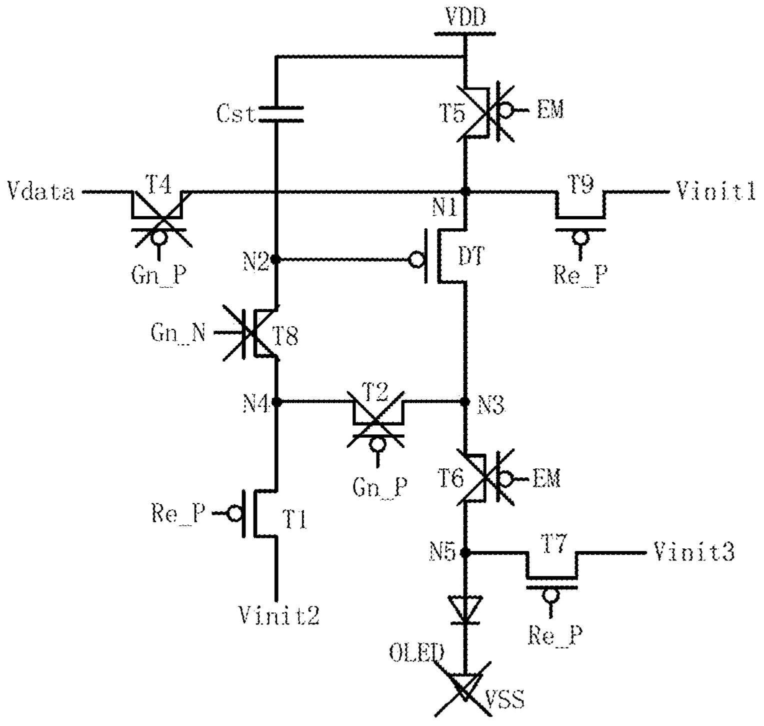
Figure 11:
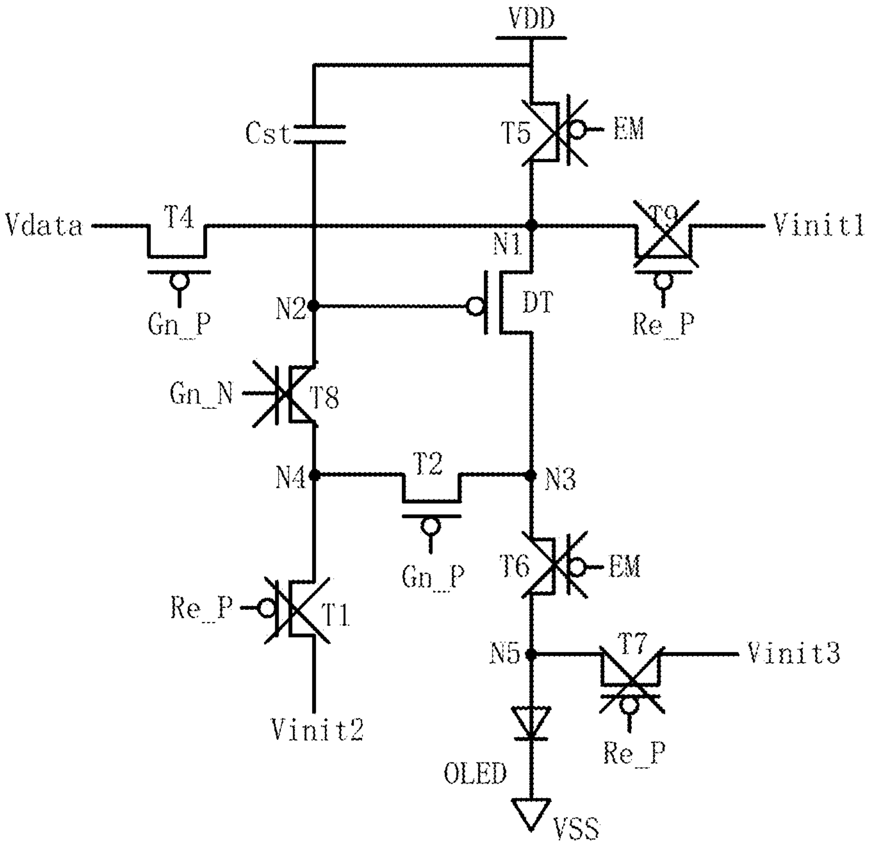

The working principle of the pixel driving circuit shown in FIG. 2 in the timing diagram shown in FIG. 4 is basically the same as the working principle in the timing diagram shown in FIG. 3, and they may go through the process shown in FIG. 5-FIG. 11.

The Difference Lies in:

In the first bias stage of the holding frame, that is, the t21 stage in FIG. 4, the high-level signals are input into the first gate signal line Gn_P, the voltage signal line VDD, the data signal line Vdata, the first initial signal line Vinit1 and the light-emitting control signal line EM; and the low-level signals are input into the reset signal line Re_P, the second gate signal line Gn_N, the second initial signal line Vinit2 and the third initial signal line Vinit3. At this moment, the first transistor T1, the seventh transistor T7, the ninth transistor T9 and the driving transistor DT are turned on, and the second transistor T2, the fourth transistor T4, the fifth transistor T5, the sixth transistor T6 and the eighth transistor T8 are turned off. Since the ninth transistor T9 is turned on, the Vkeep voltage of the first initial signal line Vinit1 is written into the first node N1 (referring to FIG. 4, the voltage value of the Vkeep voltage is greater than the voltage value of the initial voltage Vinit1), at this moment, the first node N1 has the first bias electrical signal, and the gate-source voltage of the driving transistor DT is Vgs=Vdata+Vth−Vkeep, which is the first bias process.

It should be noted that the above Vkeep voltage is the voltage value of the first bias electrical signal, the first bias electrical signal can enable the pixel driving circuit to be in the first bias stage in the holding frame. Referring to FIG. 3 and FIG. 4, the voltage value of the Vkeep voltage is greater than the voltage value of the data voltage Vdata, and the voltage value of the Vkeep voltage is greater than the voltage value of the initial voltage Vinit1.

In the second bias stage of the holding frame, that is, the t22 stage in FIG. 4, the high-level signals are input into the reset signal line Re_P, the voltage signal line VDD, the data signal line Vdata, the first initial signal line Vinit1 and the light-emitting control signal line EM; and the low-level signals are input into the first gate signal line Gn_P, the second gate signal line Gn_N, the second initial signal line Vinit2 and the third initial signal line Vinit3. At this moment, the fourth transistor T4, the second transistor T2 and the driving transistor DT are all turned on, and the fifth transistor T5, the sixth transistor T6, the first transistor T1, the seventh transistor T7, the ninth transistor T9 and the eighth transistor T8 are all turned off. Since the fourth transistor T4 is turned on, the second bias signal of the data signal line Vdata is written into the first node N1. At this moment, the gate-source voltage of the driving transistor DT is Vgs=Vdata+Vth−Vinit1, which is the second bias process.

The other stages are the same as the stages in FIG. 3 above, which is not repeated here.

A control method is provided by the embodiments of the present application. In the control method, through the reset stage of the refreshing frame, the writing stage of the refreshing frame, the second bias stage of the refreshing frame, the light-emitting stage of the refreshing frame, the first bias stage of the holding frame, the third bias stage of the holding frame and the light-emitting stage of the holding frame, it is made that the refreshing frame and the holding frame both contain two biasing processes. On the one hand, the first bias stage of the holding frame is equivalent to the reset bias process of the reset stage of the refreshing frame, and the second bias stage of the holding frame is equivalent to the third bias stage of the refreshing frame, so that the working state of the driving transistor DT tends to be consistent, so as to ensure that the brightness of the refreshing frame is not significantly different from the brightness of the holding frame, and there is no visual flicker sensation. Specifically, through the Vkeep voltage, the effect of the first bias stage of the holding frame on the driving transistor DT and the effect of the reset bias process of the reset stage of the refreshing frame on the driving transistor DT can be equivalent, and through the second bias electrical signal of the data signal line Vdata, the effect of the second bias stage of the holding frame on the driving transistor DT and the effect of the third bias stage of the refreshing frame on the driving transistor DT can be equivalent. Thus, the effect of reset bias of reset stage is partially or completely offset. On the other band, the coupling effect of the jump of the source line of the data line can be effectively reduced, and the crosstalk, noise and other adverse effects caused by the jump of the source line of the data line are reduced. On the other hand, it can be realized that the above pixel driving circuit drives the light-emitting element to emit light. On the other hand, the timing sequence is simple and easy to implement.

It should be noted that the initial signal of the first initial signal line Vinit1 in FIG. 4 can be AC (alternating current) signal, that is, the initial signal of the first initial signal line Vinit1 can be changed. At this moment, the first bias stage of the holding frame is set to be that the voltage value input by the first initial signal line Vinit1 is greater than the Vkeep voltage of the initial signal Vinit1. Of course, the initial signal of the first initial signal line Vinit1 of the refreshing frame can also be set to be Vinit1-1, and the initial signal of the first initial signal line Vinit1 of the holding frame can also be set to be Vinit1-2. The data signal of the data signal line Vdata of the holding frame is Vkeep. At this moment, the voltage value of the Vkeep can be equal to the voltage value of the Vinit1-1, and the voltage value of the Vinit1-2 can be greater than the voltage value of the Vinit1-1.

In FIG. 4, the reset signal of the reset signal line Re_P and the gate signal of the first gate signal line Gn_P can be high-frequency pulses.

In order to make driving timing simple, the driving timing signals of the voltage signal line VDD, the second initial signal line Vinit2 and the third initial signal line Vinit3 provided in the embodiments of the present application are only one case. In the practical applications, it can also be driving signals of other timing sequences. For example, in the t14 and t24 stages shown in FIG. 4, since the first transistor T1, the second transistor T2 and the seventh transistor T7 in FIG. 2 are all turned off, the signals of the second initial signal line Vinit2 and the third initial signal line Vinit3 can be of a high level or a low level.

In this text, the term “embodiment” refers to that specific features, structures, or characteristics described in conjunction with the embodiment are included in at least one embodiment of the present application.

The description provided herein describes many concrete details. However, it can be understood that the embodiments of the present application may be implemented without those concrete details. In some of the embodiments, wellknown processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

What is claimed is:

1. A pixel driving circuit, configured for driving a light-emitting element to emit light during a plurality of frame periods at a first refresh frequency, wherein each of the plurality of frame periods comprises a refreshing frame and at least one holding frame in a timing sequence, and the pixel driving circuit comprises:

a bias sub-circuit electrically connecting a reset signal line, a first gate signal line, a first initial signal line, a data signal line and a first node, wherein the bias sub-circuit is configured to make the first node have a first bias electrical signal and a second bias electrical signal in a state of the holding frame in the timing sequence, the first bias electrical signal is input from the data signal line, and the second bias electrical signal is input from the first initial signal line;

a driving sub-circuit electrically connecting the first node, a second node and a third node, wherein the driving sub-circuit is configured to conduct a path between the first node and the third node under control of a voltage of the second node, so that a current for making the light-emitting element emit the light is generated in the path, and the driving sub-circuit is further configured to, in the state of the holding frame, have a first bias process and a second bias process in the timing sequence;

a compensation sub-circuit electrically connecting a fourth node, the third node and the first gate signal line, wherein the compensation sub-circuit is configured to conduct a path between the fourth node and the third node under control of a gate signal of the first gate signal line;

a first reset sub-circuit and a second reset sub-circuit, wherein the first reset sub-circuit electrically connects the reset signal line, a second initial signal line and the second node, the first reset sub-circuit is configured to reset the second node via an initial signal of the second initial signal line under control of a reset signal of the reset signal line, the second reset sub-circuit electrically connects the reset signal line, a third initial signal line and an anode of the light-emitting element, and the second reset sub-circuit is configured to reset the anode via an initial signal of the third initial signal line under the control of the reset signal of the reset signal line;

a first light-emitting control sub-circuit and a second light-emitting control sub-circuit, wherein the first light-emitting control sub-circuit electrically connects a light-emitting control signal line, a voltage signal line and the first node, the second light-emitting control sub-circuit electrically connects the light-emitting control signal line, the third node and the anode, the first light-emitting control sub-circuit and the second light-emitting control sub-circuit are configured to transmit the current for making the light-emitting element emit the light to the anode under control of a light-emitting control signal of the light-emitting control signal line, respectively; and a storage sub-circuit electrically connecting the second node and the voltage signal line, wherein the storage sub-circuit is configured to maintain an electrical signal of the second node;

wherein the bias sub-circuit comprises a fourth transistor and a ninth transistor; a control electrode of the fourth transistor is electrically connected to the first gate signal line, a first electrode of the fourth transistor is electrically connected to the data signal line, a second electrode of the fourth transistor is electrically connected to the first node; and a control electrode of the ninth transistor is electrically connected to the reset signal line, a first electrode of the ninth transistor is electrically connected to the first initial signal line, and a second electrode of the ninth transistor is electrically connected to the first node.

2. The pixel driving circuit according to claim 1, wherein a range of the first refresh frequency comprises 1-60 Hz.

3. The pixel driving circuit according to claim 1, wherein the pixel driving circuit further comprises a regulation sub-circuit, the regulation sub-circuit electrically connects a second gate signal line, the second node and the fourth node, and the regulation sub-circuit is configured to conduct a path between the second node and the fourth node under control of a gate signal of the second gate signal line;

the driving sub-circuit comprises a driving transistor;

wherein a control electrode of the driving transistor is electrically connected to the second node, a first electrode of the driving transistor is electrically connected to the first node, and a second electrode of the driving transistor is electrically connected to the third node.

4. The pixel driving circuit according to claim 3, wherein the compensation sub-circuit comprises a second transistor;

a control electrode of the second transistor is electrically connected to the first gate signal line, a first electrode of the second transistor is electrically connected to the third node, and a second electrode of the second transistor is electrically connected to the fourth node;

the first reset sub-circuit comprises a first transistor, a control electrode of the first transistor is electrically connected to the reset signal line, a first electrode of the first transistor is electrically connected to the second initial signal line, and a second electrode of the first transistor is electrically connected to the fourth node;

the second reset sub-circuit comprises a seventh transistor, a control electrode of the seventh transistor is electrically connected to the reset signal line, a first electrode of the seventh transistor is electrically connected to the third initial signal line, a second electrode of the seventh transistor is electrically connected to a fifth node;

the first light-emitting control sub-circuit comprises a fifth transistor, a control electrode of the fifth transistor is electrically connected to the light-emitting control signal line, a first electrode of the fifth transistor is electrically connected to the voltage signal line, a second electrode of the fifth transistor is electrically connected to the first node; and the second light-emitting control sub-circuit comprises a sixth transistor, a control electrode of the sixth transistor is electrically connected to the light-emitting control signal line, a first electrode of the sixth transistor is electrically connected to the third node, and a second electrode of the sixth transistor is electrically connected to the anode.

5. The pixel driving circuit according to claim 3, wherein the regulation sub-circuit comprises an eighth transistor; and a control electrode of the eighth transistor is electrically connected to the second gate signal line, a first electrode of the eighth transistor is electrically connected to the second node, and a second electrode of the eighth transistor is electrically connected to the fourth node.

6. The pixel driving circuit according to claim 5, wherein the eighth transistor comprises an oxide transistor.

7. A display device, wherein the display device comprises the pixel driving circuit according to claim 1.

8. A control method for controlling the pixel driving circuit according to claim 1, wherein the control method comprises:

inputting the first bias electrical signal into the data signal line in the state of holding frame.

9. The control method according to claim 8, wherein the control method further comprises:

in the state of the holding frame, inputting the first bias electrical signal into the data signal line in the timing sequence, and inputting a second bias electrical signal into the first initial signal line in the timing sequence.

10. A control method for controlling the pixel driving circuit according to claim 1, wherein the control method comprises:

inputting the first bias electrical signal into the first initial signal line in the state of holding frame.

11. The control method according to claim 10, wherein the control method further comprises:

in the state of the holding frame, inputting the first bias electrical signal into the first initial signal line in the timing sequence, and inputting a second bias electrical signal into the data signal line in the timing sequence.

12. The display device according to claim 7, wherein the bias sub-circuit is further configured to, in the state of the holding frame, make the first node have the first bias electrical signal and a second bias electrical signal in the timing sequence; and the driving sub-circuit is further configured to, in the state of the holding frame, have the first bias process and a second bias process in the timing sequence.

13. The display device according to claim 7, wherein a range of the first refresh frequency comprises 1-60 Hz.

14. The display device according to claim 7, wherein the pixel driving circuit further comprises a regulation sub-circuit, the regulation sub-circuit electrically connects a second gate signal line, the second node and the fourth node, and the regulation sub-circuit is configured to conduct a path between the second node and the fourth node under control of a gate signal of the second gate signal line;

the driving sub-circuit comprises a driving transistor;

wherein a control electrode of the driving transistor is electrically connected to the second node, a first electrode of the driving transistor is electrically connected to the first node, and a second electrode of the driving transistor is electrically connected to the third node.

15. The display device according to claim 14, wherein the bias sub-circuit comprises a fourth transistor and a ninth transistor;

a control electrode of the fourth transistor is electrically connected to the first gate signal line, a first electrode of the fourth transistor is electrically connected to the data signal line, a second electrode of the fourth transistor is electrically connected to the first node; and a control electrode of the ninth transistor is electrically connected to the reset signal line, a first electrode of the ninth transistor is electrically connected to the first initial signal line, and a second electrode of the ninth transistor is electrically connected to the first node.

16. The display device according to claim 14, wherein the compensation sub-circuit comprises a second transistor;

a control electrode of the second transistor is electrically connected to the first gate signal line, a first electrode of the second transistor is electrically connected to the third node, and a second electrode of the second transistor is electrically connected to the fourth node;

the first reset sub-circuit comprises a first transistor, a control electrode of the first transistor is electrically connected to the reset signal line, a first electrode of the first transistor is electrically connected to the second initial signal line, and a second electrode of the first transistor is electrically connected to the fourth node;

the second reset sub-circuit comprises a seventh transistor, a control electrode of the seventh transistor is electrically connected to the reset signal line, a first electrode of the seventh transistor is electrically connected to the third initial signal line, a second electrode of the seventh transistor is electrically connected to a fifth node;

the first light-emitting control sub-circuit comprises a fifth transistor, a control electrode of the fifth transistor is electrically connected to the light-emitting control signal line, a first electrode of the fifth transistor is electrically connected to the voltage signal line, a second electrode of the fifth transistor is electrically connected to the first node; and the second light-emitting control sub-circuit comprises a sixth transistor, a control electrode of the sixth transistor is electrically connected to the light-emitting control signal line, a first electrode of the sixth transistor is electrically connected to the third node, and a second electrode of the sixth transistor is electrically connected to the anode.

17. The display device according to claim 14, wherein the regulation sub-circuit comprises an eighth transistor; and a control electrode of the eighth transistor is electrically connected to the second gate signal line, a first electrode of the eighth transistor is electrically connected to the second node, and a second electrode of the eighth transistor is electrically connected to the fourth node.

18. The display device according to claim 17, wherein the eighth transistor comprises an oxide transistor.

* * * * *